(12) United States Patent
Tanaka

(10) Patent No.: US 11,790,628 B2
(45) Date of Patent: Oct. 17, 2023

(54) APPARATUS AND METHOD FOR GENERATING MAP

(71) Applicant: TOYOTA JIDOSHA KABUSHIKI KAISHA, Toyota (JP)

(72) Inventor: Masahiro Tanaka, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 176 days.

(21) Appl. No.: 17/406,294

(22) Filed: Aug. 19, 2021

(65) Prior Publication Data

US 2022/0067397 A1  Mar. 3, 2022

(30) Foreign Application Priority Data

Aug. 26, 2020 (JP) ................................. 2020-142787

(51) Int. Cl.
*G06T 7/00* (2017.01)
*G06V 10/24* (2022.01)
*G06T 3/00* (2006.01)
*G06V 20/56* (2022.01)
*G06V 10/44* (2022.01)
*G06F 18/22* (2023.01)

(52) U.S. Cl.
CPC ............ *G06V 10/245* (2022.01); *G06F 18/22* (2023.01); *G06T 3/0075* (2013.01); *G06V 10/44* (2022.01); *G06V 20/588* (2022.01)

(58) Field of Classification Search
CPC .. G06V 20/182; G06V 20/588; G06V 30/422; G06T 17/05; G06T 3/0075
See application file for complete search history.

(56) References Cited

U.S. PATENT DOCUMENTS

| 6,470,265 | B1 | 10/2002 | Tanaka | |
| 7,660,441 | B2* | 2/2010 | Chen | G06T 7/33 |
| | | | | 382/113 |
| 2017/0116477 | A1* | 4/2017 | Chen | G01C 21/3819 |
| 2018/0188059 | A1* | 7/2018 | Wheeler | G06T 17/05 |
| 2020/0247431 | A1* | 8/2020 | Ferencz | G01C 21/3658 |
| 2020/0355506 | A1* | 11/2020 | Muto | G06T 7/74 |
| 2021/0304424 | A1* | 9/2021 | Zaid | H04N 23/951 |

FOREIGN PATENT DOCUMENTS

| JP | H11184375 A | 7/1999 |
| JP | 2005274994 A | 10/2005 |
| JP | 2019133498 A | 8/2019 |

* cited by examiner

*Primary Examiner* — Emily C Terrell
*Assistant Examiner* — Ahmed A Nasher
(74) *Attorney, Agent, or Firm* — Dickinson Wright, PLLC

(57) ABSTRACT

An apparatus for generating a map identifies a lane line and a feature other than a lane line on a road from a first image of a predetermined location of the road taken downward from the sky; identifies the lane line and the feature from a second image representing the predetermined location of the road and made based on images taken by a camera provided for a vehicle; aligning the first images with the second images, based on the predetermined location; deforms the second image so that the feature in the second image best fits the feature in the first image; further deforms the second image in a direction perpendicular to the front-back direction of the road so that the position of the feature remains unchanged and that the positions of the lane lines in the first and second images match; and combines the first and deformed second images.

4 Claims, 7 Drawing Sheets

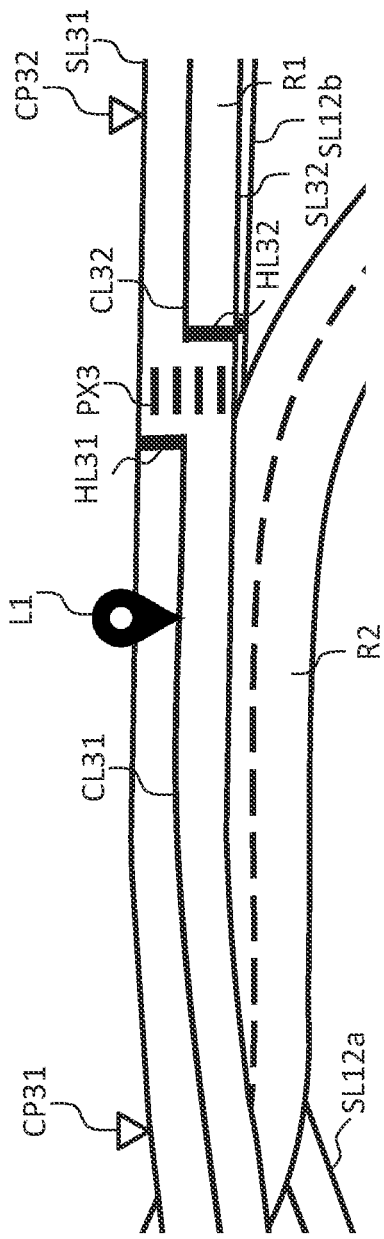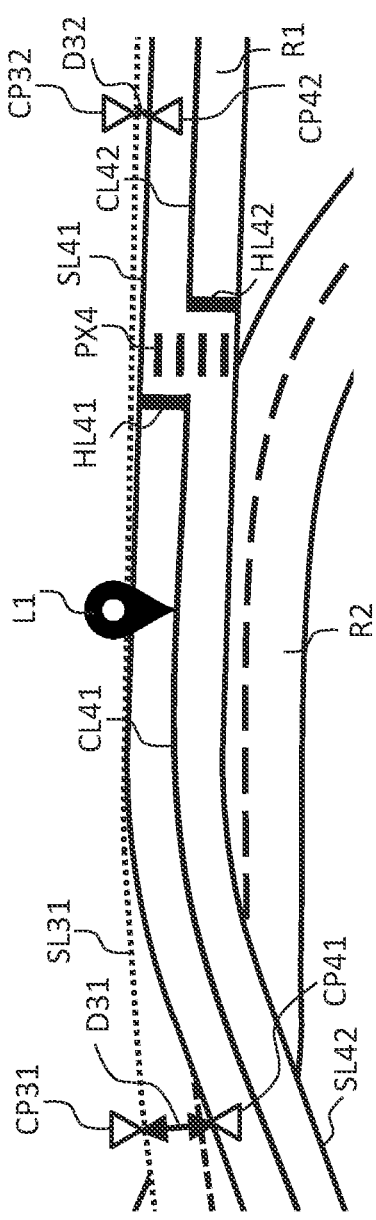
FIG. 6A
FIG. 6B

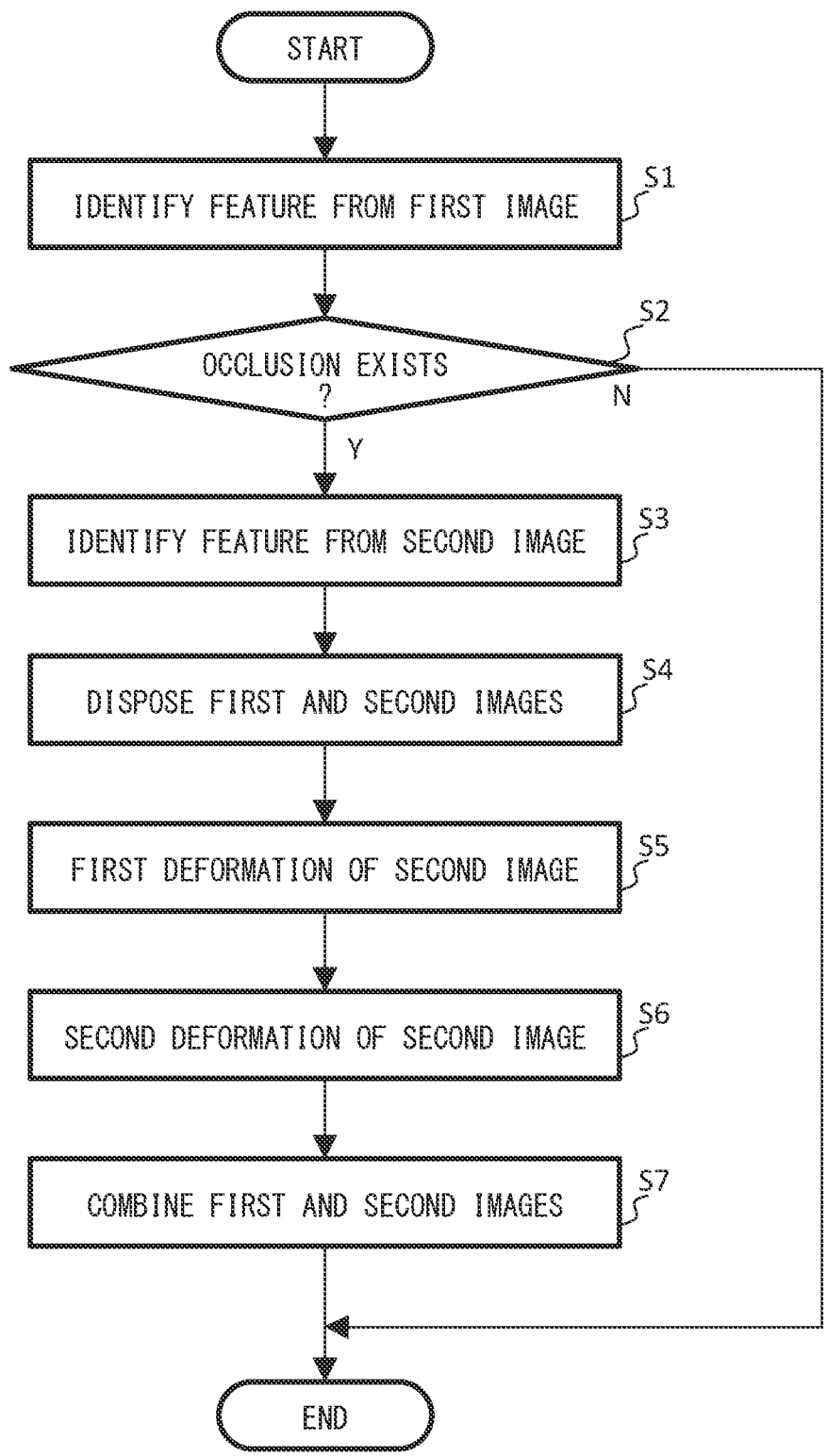

APPARATUS AND METHOD FOR GENERATING MAP

FIELD

The present disclosure relates to an apparatus and a method for generating a map, based on images.

BACKGROUND

An apparatus is known that generates a high-precision map, based on a satellite photograph of roads taken from the sky. Such a high-precision map is used for automated driving control of a vehicle.

Japanese Unexamined Patent Publication No. 11-184375 describes an apparatus for processing map data. This apparatus extracts road network data of the ground, based on image data taken from the sky, and superposes the road network data on a digital road map to generate digital map data.

SUMMARY

When an image of roads is taken from the sky, obstacles, such as buildings and roadside trees, may exist between the position from which the image is taken and the roads. In an image taken in such a situation, the roads are covered by the obstacles. From an image of a road having a hidden region (occlusion), white lines and features on the road cannot be appropriately identified, and thus a map cannot be appropriately generated.

It is an object of the present disclosure to provide an apparatus that can appropriately generate a map, using an image taken from the sky.

An apparatus for generating a map according to the present disclosure includes a processor configured to identify a lane line and a feature other than a lane line on a road from a first image of a predetermined location of the road taken downward from the sky; identify the lane line and the feature other than a lane line from a second image representing the predetermined location of the road, the second image being made based on images generated by capturing surroundings of a vehicle with a camera provided for the vehicle; align the first image with the second image, based on the predetermined location; deform the second image so that the feature other than a lane line in the second image best fits the feature in the first image; further deform the deformed second image in a direction perpendicular to the lane line so that the position of the feature other than a lane line remains unchanged and that the position of the lane line in the second image matches the position of the lane line in the first image; and combine the first image and the further deformed second image.

The processor of the apparatus according to the present disclosure is preferably configured to determine whether the road represented in the first image includes a hidden region covered by an object, in the identifying of the lane line and the feature from the first image; and to combine a first image which is determined that the hidden region is included with the further deformed second image and not to combine a first image which is determined that the hidden region is not included with the further deformed second image, in the combining of the first image and the further deformed second image.

The processor of the apparatus according to the present disclosure is preferably configured to deform the second image by means of affine transformation; and to further perform spline deformation of the deformed second image.

A method for generating a map according to the present disclosure includes identifying a lane line and a feature other than a lane line from a first image of a predetermined location of a road taken downward from the sky; identifying the lane line and the feature other than a lane line from a second image representing the predetermined location of the road, the second image being made based on images captured by a camera provided for a vehicle; aligning the first image with the second image, based on the predetermined location; deforming the second image so that the feature other than a lane line best fits the feature in the first image; further deforming the deformed second image in a direction perpendicular to the lane line so that the position of the feature other than a lane line remains unchanged and that the position of the lane line in the second image matches the position of the lane line in the first image; and combining the first image and the further deformed second image.

The apparatus according to the present disclosure can appropriately generate a map, using an image taken from the sky.

BRIEF DESCRIPTION OF DRAWINGS

FIG. 6A illustrates the second image deformed by the first deforming unit.

FIG. 6B is a diagram for explaining deformation of the second image by a second deforming unit.

FIG. 7 is a flowchart of a map generating process.

DESCRIPTION OF EMBODIMENTS

Hereinafter, an apparatus for generating a map will be explained in detail with reference to the accompanying drawings. The apparatus generates a map, based on a first image of a road taken downward from the sky and a second image made based on images taken by a camera provided for a vehicle. First, the apparatus identifies a lane line and a feature other than a lane line on a road from a first image of a predetermined location of the road. The apparatus also identifies the lane line and the feature other than a lane line from a second image representing the predetermined location of the road. Next, the apparatus aligns the first image with the second image, based on the predetermined location. Subsequently, the apparatus deforms the second image so that the feature other than a lane line in the second image best fits the feature in the first image. The apparatus further deforms the second image in a direction perpendicular to the front-back direction of the road so that the position of the feature other than a lane line remains unchanged and that the position of the lane line in the second image matches the position of the lane line in the first image. The apparatus then combines the first image and the further deformed second image.

Figure 1:
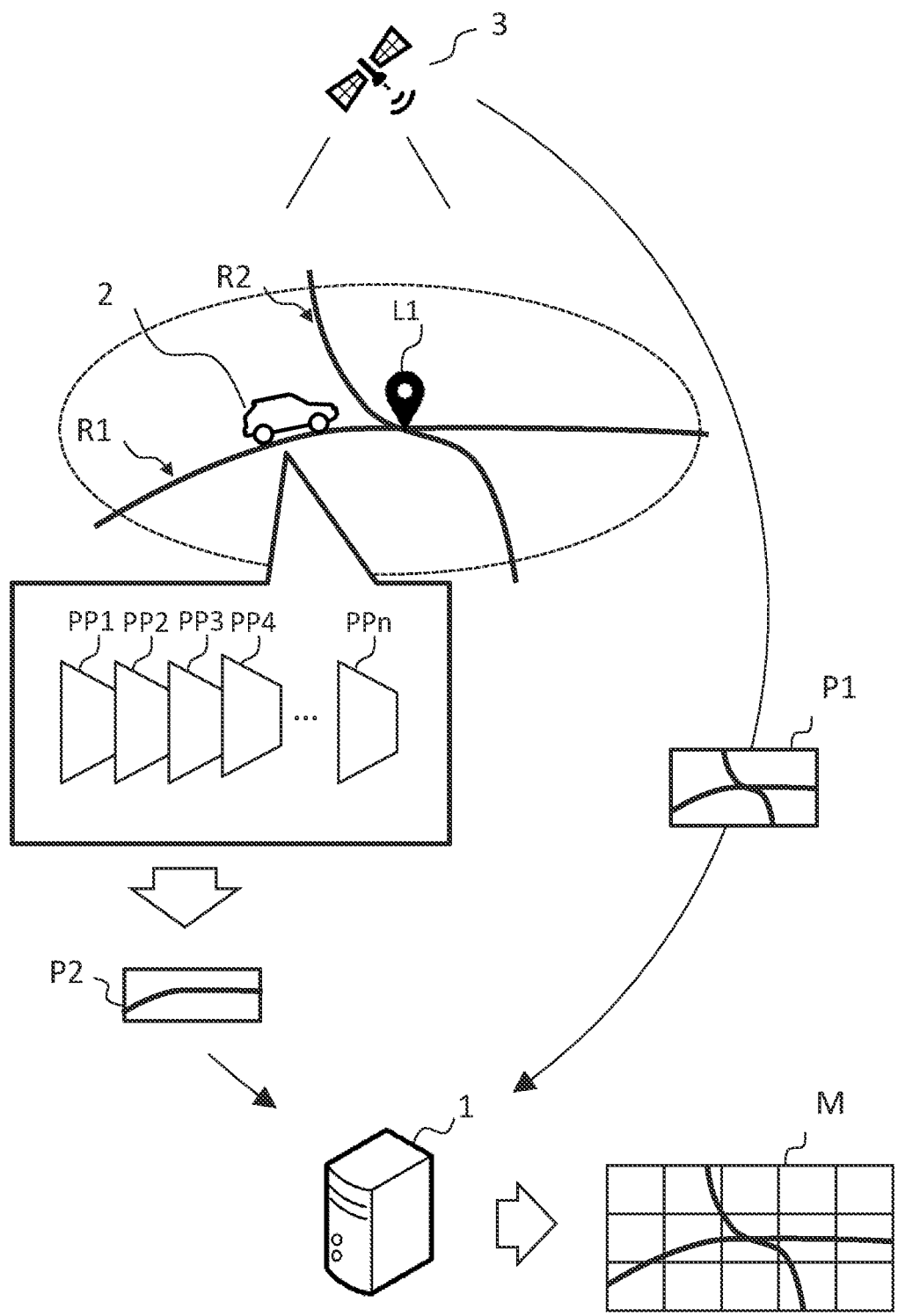
FIG. 1 is a diagram for briefly describing operation of an apparatus for generating a map.

FIG. 1 is a diagram for briefly describing operation of an apparatus for generating a map.

An artificial satellite 3 takes a first image P1 downward from the sky. The first image P1 includes a location L1 near a spot where roads R1 and R2 cross. A camera is provided in the front of the interior of a vehicle 2, which is traveling on the road R1, and oriented in the forward direction of the vehicle 2. The camera is an example of an image capturing unit, and includes a two-dimensional detector constructed from an array of optoelectronic transducers, such as CCD or C-MOS, having sensitivity to visible light and a focusing optical system focusing an image of a target region on the two-dimensional detector. The camera takes a picture of a region in front of the vehicle 2 every predetermined capturing period (e.g., 1/30 to 1/10 seconds), and generates sub-images PP1-PPn showing this region. A second image P2 is made by joining the sub-images PP1-PPn so as to overlap common portions thereof. An apparatus 1 for generating a map uses the first image P1 and the second image P2 to execute a map generating process, generating a map M.

Figure 2:
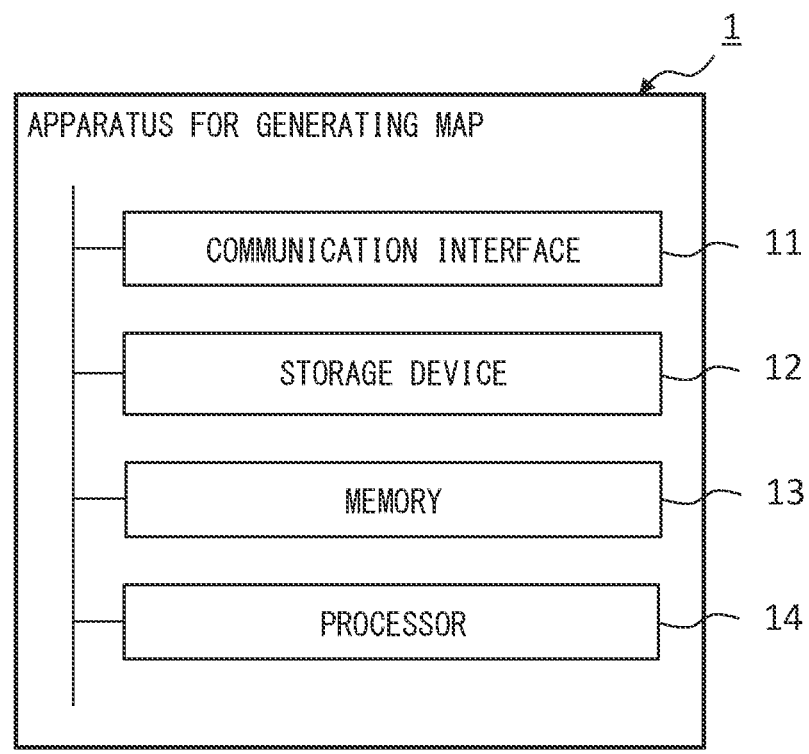
FIG. 2 illustrates the hardware configuration of the apparatus for generating a map.

FIG. 2 illustrates the hardware configuration of the apparatus 1 for generating a map. The apparatus 1 includes a communication interface 11, a storage device 12, a memory 13, and a processor 14.

The communication interface 11 is an example of a communication unit, and includes an interface circuit for connecting the apparatus 1 to a communication network. The communication interface 11 is configured so that it can communicate with another device via the communication network. More specifically, the communication interface 11 passes to the processor 14 data received from another device via the communication network, and transmits data received from the processor 14 to another device via the communication network.

The storage device 12 is an example of a storage unit, and includes storage, such as a hard disk drive or a nonvolatile semiconductor memory. The storage device 12 stores a first image of a road taken downward from the sky, a second image made based on images captured by the image capturing unit provided for the vehicle, and a map generated based on the first and second images. The first and second images are received from another device via the communication interface 11.

The memory 13 includes volatile and nonvolatile semiconductor memories. The memory 13 temporarily stores various types of data used for processing by the processor 14, such as data received via the communication interface 11. The memory 13 also stores various application programs, such as a map generating program for generating a map, based on the first and second images.

The processor 14 includes one or more central processing units (CPUs) and a peripheral circuit thereof. The processor 14 may further include another operating circuit, such as a logic-arithmetic unit or an arithmetic unit.

Figure 3:
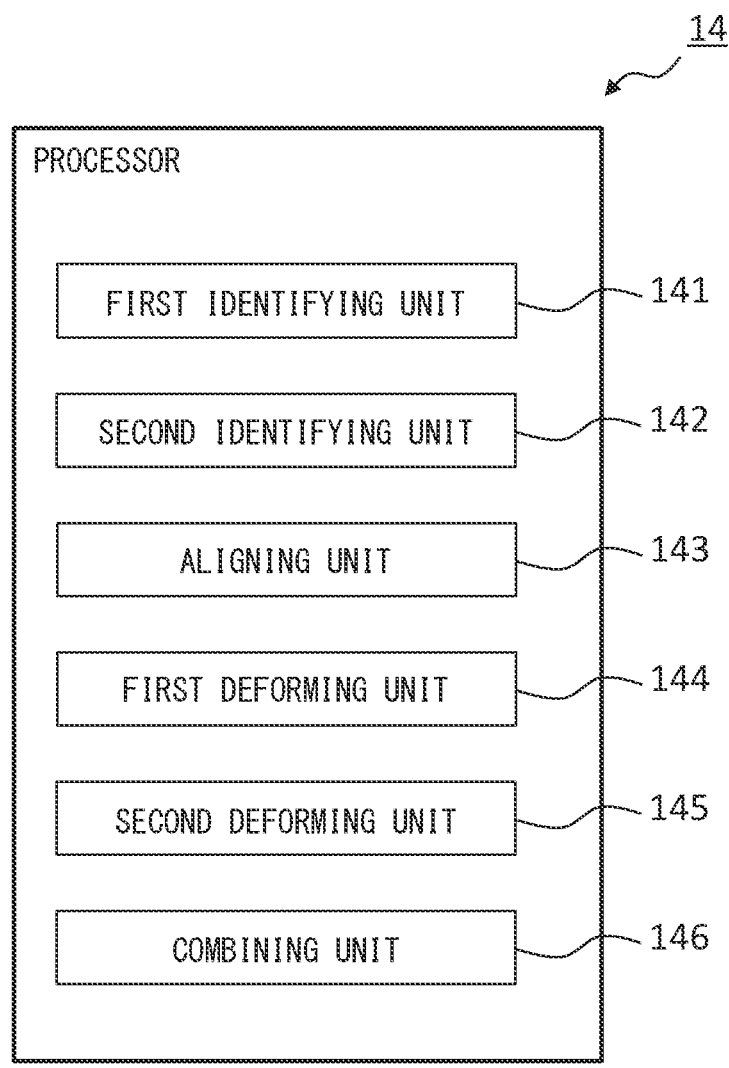
FIG. 3 is a functional block diagram of a processor included in the apparatus for generating a map.

FIG. 3 is a functional block diagram of the processor 14 included in the apparatus 1 for generating a map.

As its functional blocks, the processor 14 of the apparatus 1 includes a first identifying unit 141, a second identifying unit 142, a aligning unit 143, a first deforming unit 144, a second deforming unit 145, and a combining unit 146. These units included in the processor 14 are functional modules implemented by a program executed on the processor 14, or may be implemented in the apparatus 1 as separate integrated circuits, microprocessors, or firmware.

The first identifying unit 141 reads out from the storage device 12 a first image of a predetermined location of a road taken downward from the sky. The first image is obtained in advance and stored in the storage device 12. The first identifying unit 141 inputs the first image into a classifier that has been trained to identify lane lines and features other than lane lines on a road, thereby identifying lane lines and features other than lane lines from the first image.

The classifier may be, for example, a convolution neural network (CNN) including multiple layers connected in series from the input toward the output. A CNN that has been trained using, as training data, inputted images including lane lines and features other than lane lines, which are targets for detection, operates as a classifier to detect such lane lines and features.

The first identifying unit 141 may determine whether a road represented in the first image has a hidden region (occlusion) covered by an object. For example, when a lane line of a road is discontinuously detected, the first identifying unit 141 determines that the road has an occlusion. The first identifying unit 141 treats a first image including a road having an occlusion as a target for the subsequent processing. However, as for a first image not including a road having an occlusion, the processor 14 terminates the process without executing the subsequent processing.

The first image is a satellite photograph taken by a camera mounted on an artificial satellite. The first image may be an aerial photograph taken by a camera mounted on an aircraft.

Each pixel of the first image is given positional information by aligning with respect to map data including positional information.

The second identifying unit 142 reads out from the storage device 12 a second image representing a predetermined location of a road. The second image is made based on images captured by the image capturing unit provided for the vehicle 2, and is obtained in advance and stored in the storage device 12. The second identifying unit 142 inputs the second image into a classifier that has been trained to identify lane lines and features other than lane lines on a road, thereby identifying lane lines and features other than lane lines from the second image. The classifier may be a CNN.

The second image is made by joining sub-images captured every predetermined capturing period by the camera, which is an example of the image capturing unit, provided for the vehicle 2 so as to overlap common portions thereof. Each pixel of the second image is given positional information, based on positional information obtained at capturing the sub-images by a global navigation satellite system (GNSS) receiver provided for the vehicle 2.

Figure 4A:
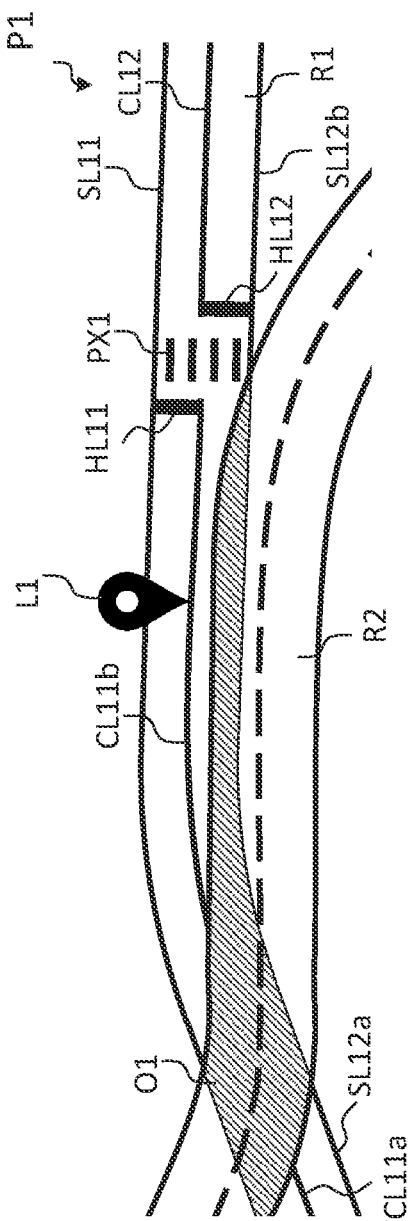
FIG. 4A illustrates an example of a first image.
Figure 4B:
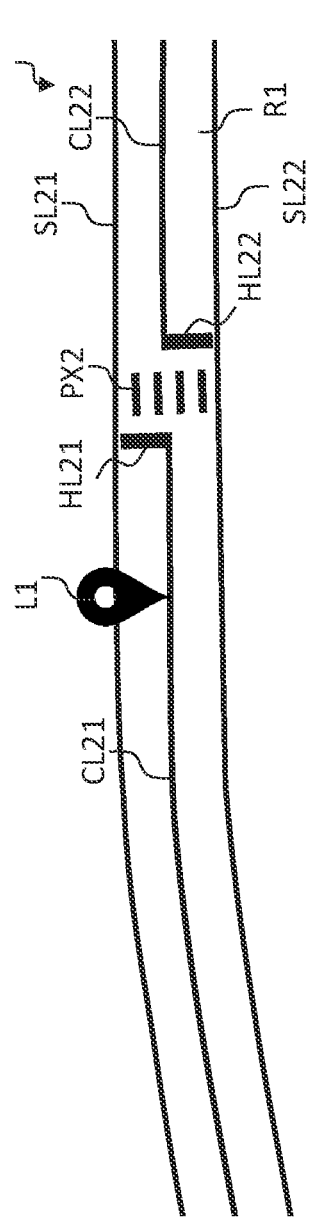
FIG. 4B illustrates an example of a second image.

FIG. 4A illustrates an example of the first image, and FIG. 4B illustrates an example of the second image.

The first image P1 illustrated in FIG. 4A includes a road R1 passing through a predetermined location L1 and a road R2 crossing the road R1 above the road R1. From the first image P1, the first identifying unit 141 identifies side lines SL11, SL12a, and SL12b and center lines CL11a, CL11b, and CL12 as lane lines. From the first image P1, the first identifying unit 141 also identifies stop lines HL11 and HL12 and a pedestrian crossing PX1 as features other than lane lines. In the road R1 in the first image P1, the side lines SL12a and SL12b and the center lines CL11a and CL11b are discontinuous, and the road R1 has a hidden region O1 covered by the road R2. The hidden region O1 is hatched in FIG. 4A in order to distinguish it from other regions, but the hidden region O1 in the actual first image P1 has the same outward appearance as the other regions in the road R2.

The second image P2 illustrated in FIG. 4B includes the road R1 passing through the predetermined location L1. From the second image P2, the second identifying unit 142 identifies side lines SL21 and SL22 and center lines CL21 and CL22 as lane lines. From the second image P2, the second identifying unit 142 also identifies stop lines HL21 and HL22 and a pedestrian crossing PX2 as features other than lane lines.

The aligning unit 143 disposes the first and second images so that the predetermined location in the first image matches the predetermined location in the second image, thereby performing alignment of the first and second images, based on the predetermined location.

The first deforming unit 144 deforms the second image so that the features other than lane lines in the second image best fit those in the first image, and temporarily stores the deformed image in the memory 13. For example, the first deforming unit 144 determines coefficients of a linear polynomial so that the predetermined locations for alignment of the first and second images and the positions of the features other than lane lines identified in the first and second images match. The first deforming unit 144 then uses the determined linear polynomial to perform affine transformation of the pixels of the second image, thereby deforming the second image. The deformation by affine transformation includes scaling, shearing, rotation, and translation.

Figure 5A:
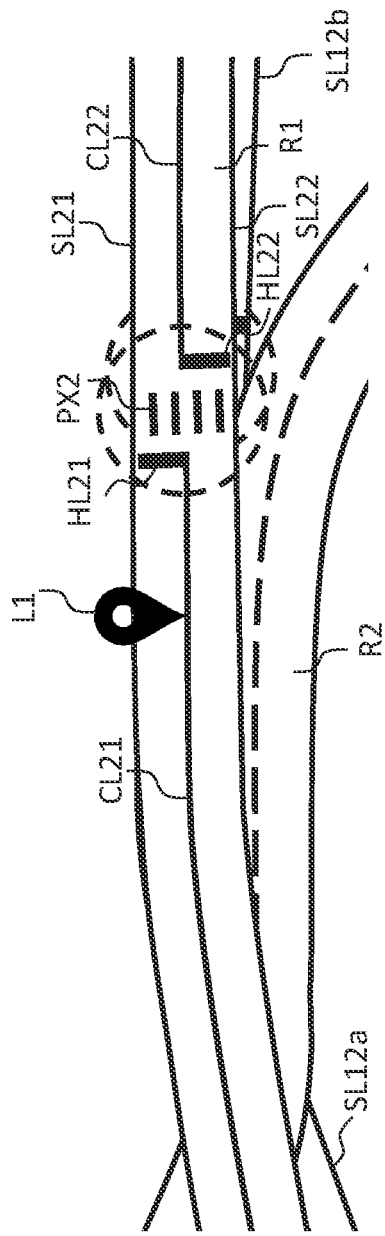
FIG. 5A illustrates an example of the second image aligned with respect to the first image.
Figure 5B:
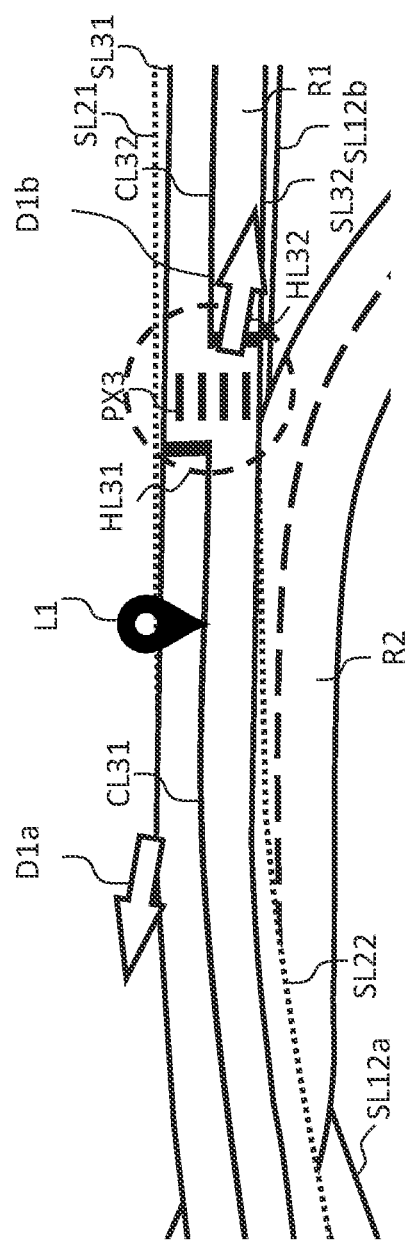
FIG. 5B is a diagram for explaining deformation of the second image by a first deforming unit.

FIG. 5A illustrates an example of the second image P2 aligned with respect to the first image P1. FIG. 5B is a diagram for explaining deformation of the second image P2 by the first deforming unit 144. FIGS. 5A and 5B illustrate the aligned first image P1 together with the second image P2 so that the relationship between the first image P1 and the second image P2 can be clearly grasped.

In FIG. 5A, the second image P2 is disposed so that the predetermined location L1 matches the predetermined location L1 in the first image P1. At this time, the positions of the stop lines HL21 and HL22 and the pedestrian crossing PX2, which are features other than lane lines, in the second image P2 do not match those of the stop lines HL11 and HL12 and the pedestrian crossing PX1 in the first image P1.

The second image is deformed using a linear polynomial that makes the positions of the stop lines HL21 and HL22 and the pedestrian crossing PX2 match those of the stop lines HL11 and HL12 and the pedestrian crossing PX1 in the first image P1. In FIG. 5B, the directions in which the pixels of the second image P2 move around the location L1 are indicated by arrows D1a and D1b. In FIG. 5B, the side lines SL21 and SL22 before the deformation are indicated by dotted lines, and side lines SL31 and SL32 after the deformation by solid lines.

The second deforming unit 145 further deforms the second image deformed by the first deforming unit 144, and temporarily stores the deformed image in the memory 13. Deformation by the second deforming unit 145 is such that the positions of the features other than lane lines remain unchanged and that the positions of the lane lines in the second image match those of the lane lines in the first image. At this time, the second deforming unit 145 deforms the second image, which is deformed by the first deforming unit 144, in a direction perpendicular to the front-back direction of the road. For example, the second deforming unit 145 designates the predetermined location for alignment of the first and second images and the positions of the features other than lane lines identified in the first and second images as control points that are not moved by the deformation. The second deforming unit 145 then identifies points on a lane line in the first image apart in a direction perpendicular to the corresponding lane line in the second image from the corresponding points on the latter lane line, and determines a curve passing through the identified points and having the smallest curvature. The second deforming unit 145 then performs spline deformation of the second image, using the determined curve. The second deforming unit 145 may apply deformation other than spline deformation, such as deformation along a Bézier curve, to the second image.

FIG. 6A illustrates the second image P2 deformed by the first deforming unit 144. FIG. 6B is a diagram for explaining deformation of the second image P2 by the second deforming unit 145. FIGS. 6A and 6B illustrate the aligned first image P1 together with the second image P2 so that the relationship between the first image P1 and the second image P2 can be clearly grasped.

In FIG. 6A, the positions of the lane lines in the second image P2 deformed by the first deforming unit 144 do not match those of the lane lines in the first image P1 (for simplicity of description, FIG. 6A illustrates only differences in the positions of the side lines). The second deforming unit 145 sets control points CP31 and CP32 on the side line SL31, whose position does not match the position in the first image P1. Each control point is set, for example, at a position on a lane line a predetermined distance away from a spot deviating from the position in the first image P1 more than a predetermined deviation threshold.

As illustrated in FIG. 6B, the second deforming unit 145 identifies control points CP41 and CP42 on the side line SL11 in the first image P1 apart in directions D31 and D32 perpendicular to the corresponding side line SL31 from the control points CP31 and CP32 in the second image P2. The second deforming unit 145 determines a curve passing through the identified control points CP41 and CP42 and having the smallest curvature. The second deforming unit 145 then performs spline deformation of the second image, using the determined curve. In FIG. 6B, the side line SL31 before the deformation is indicated by a dotted line, and side lines SL41 and SL42 after the deformation by solid lines. The side line SL32 before the deformation is not shown in the figure because it is covered by the road R1 after the deformation.

The combining unit 146 combines the first image stored in the storage device 12 with the second image deformed by the second deforming unit and temporarily stored in the memory 13, and stores the combined image in the storage device 12. This enables the apparatus 1 to generate a map appropriately interpolated with the second image even when a road represented in the first image has an occlusion.

FIG. 7 is a flowchart of a map generating process. For each first image and each second image to be processed, the processor 14 of the apparatus 1 executes the map generating process illustrated in FIG. 7.

First, the first identifying unit 141 of the processor 14 identifies a lane line and a feature other than a lane line on a road from a first image (step S1). The first image is an image of a predetermined location of the road taken downward from the sky.

Next, the first identifying unit 141 determines whether the road represented in the first image has an occlusion (step S2). If it is determined that it does not have any occlusion (No in step S2), the first identifying unit 141 terminates the map generating process.

If it is determined that the road represented in the first image has an occlusion (Yes in step S2), the second identifying unit 142 of the processor 14 identifies a lane line and a feature other than a lane line from a second image (step S3). The second image is an image representing the predetermined location of the road and made based on images captured by an image capturing unit provided for a vehicle.

Next, the aligning unit 143 of the processor 14 performs alignment of the first and second images, based on the predetermined location (step S4).

Subsequently, the first deforming unit 144 of the processor 14 deforms the second image so that the feature other than a lane line in the second image best fits the feature in the first image (step S5).

Next, the second deforming unit 145 of the processor 14 further deforms the second image, which is deformed by the first deforming unit, so that the position of the feature other than a lane line remains unchanged and that the position of the lane line in the second image matches the position of the lane line in the first image (step S6). At this time, the second deforming unit 145 deforms the second image in a direction perpendicular to the front-back direction of the road.

Then, the combining unit 146 of the processor combines the first image and the second image deformed by the second deforming unit 145 (step S7), and terminates the map generating process.

Executing the map generating process in this way, the apparatus 1 can appropriately generate a map, using an image taken from the sky.

Additionally, the first deforming unit 144 deforms the second image P2 by means of affine transformation, and the second deforming unit 145 further performs spline deformation of the second image P2 deformed by means of affine transformation, which enables reduction in process load of the processor 14 and appropriate generation of a map.

Note that those skilled in the art can apply various changes, substitutions, and modifications without departing from the spirit and scope of the present disclosure.

What is claimed is:

1. An apparatus for generating a map, comprising a processor configured to
    identify a lane line and a feature other than a lane line on a road from a first image of a predetermined location of the road taken downward from the sky;
    identify the lane line and the feature other than a lane line from a second image representing the predetermined location of the road, the second image being made based on images generated by capturing surroundings of a vehicle with a camera provided for the vehicle;
    align the first image with the second image, based on the predetermined location;
    deform the second image so that the feature other than a lane line in the second image best fits the feature in the first image;
    further deform the deformed second image in a direction perpendicular to the lane line so that the position of the feature other than a lane line remains unchanged and that the position of the lane line in the second image matches the position of the lane line in the first image; and
    combine the first image and the further deformed second image;
    wherein the processor is further configured
    to determine whether the road represented in the first image includes a hidden region covered by an object, in the identifying of the lane line and the feature from the first image; and
    to combine a first image in which the first image is determined that the hidden region is included, with the further deformed second image and not to combine a first image in which the first image is determined that the hidden region is not included, with the further deformed second image.

2. The apparatus according to claim 1, wherein the processor is further configured
    to determine whether the road represented in the first image includes a hidden region covered by an object, in the identifying of the lane line and the feature from the first image; and
    to combine a first in which the first image is determined that the hidden region is included with the further deformed second image and not to combine a first image in which the first image is determined that the hidden region is not included with the further deformed second image.

3. The apparatus according to claim 1, wherein the processor is configured to
    deform the second image by means of affine transformation; and
    further perform spline deformation of the deformed second image.

4. A method for generating a map, comprising:
    identifying a lane line and a feature other than a lane line from a first image of a predetermined location of a road taken downward from the sky;
    identifying the lane line and the feature other than a lane line from a second image representing the predetermined location of the road, the second image being made based on images taken by a camera provided for a vehicle;
    aligning the first image with the second image, based on the predetermined location;
    deforming the second image so that the feature other than a lane line best fits the feature in the first image;
    further deforming the deformed second image in a direction perpendicular to the lane line so that the position of the feature other than a lane line remains unchanged and that the position of the lane line in the second image matches the position of the lane line in the first image; and
    combining the first image and the further deformed second image;
    determining whether the road represented in the first image includes a hidden region covered by an object, in the identifying of the lane line and the feature from the first image; and
    combining a first image in which the first image is determined that the hidden region is included, with the further deformed second image and not to combine a first image in which the first image is determined that the hidden region is not included, with the further deformed second image.

* * * * *